(12) United States Patent
Zhang

(10) Patent No.: US 11,049,527 B2
(45) Date of Patent: Jun. 29, 2021

(54) SELECTING A RECORDING MODE BASED ON AVAILABLE STORAGE SPACE

(71) Applicant: MOTOROLA MOBILITY LLC, Chicago, IL (US)

(72) Inventor: Liang Zhang, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 186 days.

(21) Appl. No.: 15/813,794

(22) Filed: Nov. 15, 2017

(65) Prior Publication Data

US 2018/0144776 A1    May 24, 2018

(30) Foreign Application Priority Data

Nov. 24, 2016 (CN) .......................... 201611052696.8

(51) Int. Cl.
*G11B 27/36* (2006.01)
*H04N 5/76* (2006.01)
*H04N 5/232* (2006.01)
*H04N 5/77* (2006.01)
*H04N 9/804* (2006.01)

(52) U.S. Cl.
CPC ......... *G11B 27/36* (2013.01); *H04N 5/23245* (2013.01); *H04N 5/232933* (2018.08); *H04N 5/232941* (2018.08); *H04N 5/76* (2013.01); *H04N 5/772* (2013.01); *H04N 9/8042* (2013.01)

(58) Field of Classification Search
CPC ..... G11B 27/36; H04N 5/23245; H04N 5/772
See application file for complete search history.

(56) References Cited

U.S. PATENT DOCUMENTS

| | | | | |
|---|---|---|---|---|
| 6,385,386 | B1 * | 5/2002 | Aotake | G11B 27/034 386/235 |
| 6,411,771 | B1 * | 6/2002 | Aotake | G06K 9/00765 386/282 |
| 6,553,180 | B1 * | 4/2003 | Kikuchi | G11B 19/022 386/241 |
| 6,574,422 | B1 * | 6/2003 | Kikuchi | G11B 19/04 386/248 |
| 6,584,272 | B1 * | 6/2003 | Fukushima et al. | H04N 9/79 386/230 |
| 6,798,980 | B1 * | 9/2004 | Seo | H04N 5/76 386/232 |

(Continued)

*Primary Examiner* — Gelek W Topgyal
(74) *Attorney, Agent, or Firm* — Isidore PLLC

(57) ABSTRACT

A method, system, and computer program product for selecting a recording mode used by audio and/or video input devices on a device. The method includes determining an initial recording mode associated with a live recording on an electronic device. In response to determining the initial recording mode, the electronic device determines, based on the initial recording mode, a maximum recording length of the live recording that may be stored in available free space. In response to determining the maximum recording length is less than the predetermined threshold, the electronic device issues a warning that includes the maximum recording length to at least one output device. The method further includes enabling entry of a first response to the warning that includes an identification of an alternate recording mode and that extends the maximum recording length for the live recording within the at least one storage device.

19 Claims, 7 Drawing Sheets

(56) References Cited

U.S. PATENT DOCUMENTS

| | | | | |
|---|---|---|---|---|
| 7,248,778 B1* | 7/2007 | Anderson | ............ | G11B 27/034 386/280 |
| 7,869,697 B2* | 1/2011 | Nagaoka | ............ | H04N 5/23293 348/231.1 |
| 9,036,982 B2* | 5/2015 | Hosokawa | ............... | H04N 5/76 386/294 |
| 2002/0003576 A1* | 1/2002 | Konishi | ................. | H04N 1/212 348/231.99 |
| 2002/0186961 A1* | 12/2002 | Kikuchi | ................. | G11B 19/04 386/248 |
| 2007/0058947 A1* | 3/2007 | Yoshida | ................... | H04N 5/91 386/292 |
| 2008/0136935 A1* | 6/2008 | Kudo | ........................ | H04N 5/77 348/231.1 |
| 2009/0073266 A1* | 3/2009 | Abdellaziz Trimeche | ................... | H04N 5/23293 348/180 |
| 2010/0013999 A1* | 1/2010 | Momosaki | ............ | H04N 19/40 348/581 |

* cited by examiner

SELECTING A RECORDING MODE BASED ON AVAILABLE STORAGE SPACE

This application claims priority to Chinese Patent Application No. 201611052696.8, filed Nov. 24, 2016, the contents of which is fully incorporated by reference.

BACKGROUND

1. Technical Field

The present disclosure generally relates to electronic devices and in particular to an improved method for recording audio and video content on an electronic device.

2. Description of the Related Art

Modern electronic devices, such as cellular phones, may be used to record video and/or audio recordings. However, these devices typically have a limited storage capacity and thus may not be suitable for storing media recorded at a high quality. For example, some cellular phones may only have enough available memory to store a few dozen minutes of video at full high definition (HD) quality before the internal storage is completely full. While a lesser resolution and/or greater compression may be applied to a live recording to store longer media recordings in storage, these devices may not identify a specific recording length that may be provided by various other resolution/compression options.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
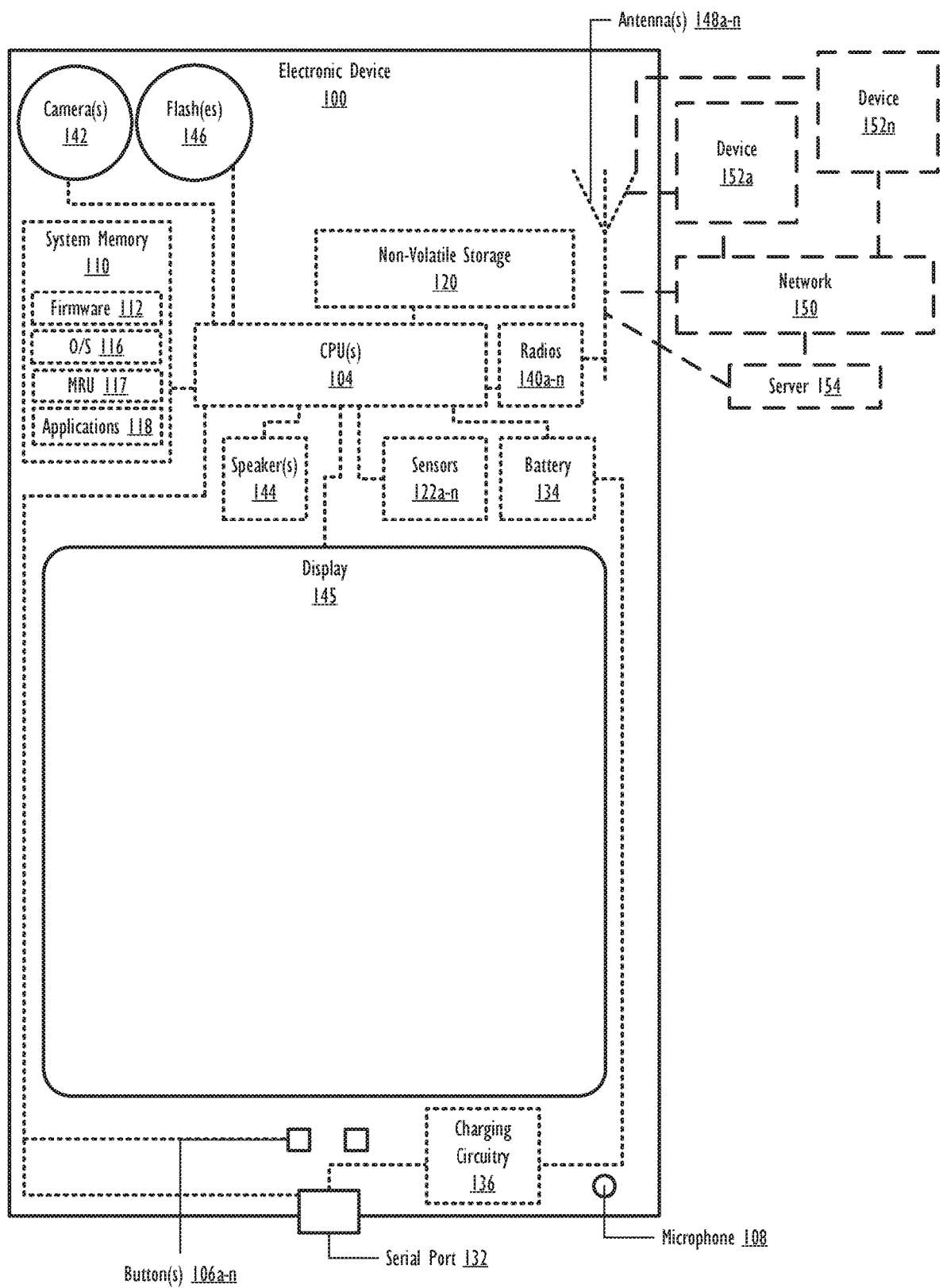
FIG. 1 illustrates an electronic device within which certain aspects of the disclosure can be practiced, in accordance with one or more embodiments.

The illustrative embodiments provide a method, system, and computer program product for selecting a recording mode used by audio and/or video input devices on a device. The method includes determining an initial recording mode associated with a live recording on an electronic device. In response to determining the initial recording mode, the electronic device determines, based on the initial recording mode, a maximum recording length of the live recording that may be stored in available free space of at least one storage device of the electronic device. The method further includes determining whether the maximum recording length is less than a predetermined threshold. In response to determining the maximum recording length is less than the predetermined threshold, the electronic device issues a warning that includes the maximum recording length to at least one output device. The method further includes enabling entry of a first response to the warning that includes an identification of an alternate recording mode and that extends the maximum recording length for the live recording within the at least one storage device.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

As utilized herein, a live recording refers to any recording of video and/or audio by at least one recording device of an electronic device. Recording devices may include, but are not limited to: cameras, microphones, and other imaging sensors.

Those of ordinary skill in the art will appreciate that the hardware components and basic configuration depicted in the following figures may vary. For example, the illustrative components within electronic device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Now turning to FIG. 1, there is illustrated an example electronic device 100 within which one or more of the described features of the various embodiments of the disclosure can be implemented. In one embodiment, electronic device 100 can be any electronic device that includes at least one camera, such as, but not limited to, a notebook computer, desktop computer, monitor, mobile phone, digital camera, video recorder, or tablet computer. Electronic device 100 includes at least one processor or central processing unit (CPU) 104. CPU 104 is coupled to non-volatile storage 120 and system memory 110, within which firmware 112, operating system (OS) 116, media recording utility (MRU) 117, and applications 118 can be stored for execution on CPU 104. According to one aspect, MRU 117 executes within electronic device 100 to perform the various methods and functions described herein. In one or more embodiments, MRU 117 determines an alternate recording mode based on a recording capacity of at least one memory (e.g., system memory 110 and/or non-volatile storage 120) and applies the determined alternate recording mode to the electronic device. For simplicity, MRU 117 is illustrated and described as a stand-alone or separate software/firmware/logic component, which provides the specific functions and methods described below. However, in at least one embodiment, MRU 117 may be a component of, may be combined with, or may be incorporated within firmware 112, or OS 116, and/or within one or more of applications 118.

As shown, electronic device 100 may include input devices and output devices that enable a user to interface with electronic device 100. In the illustrated embodiment, electronic device 100 includes camera(s) 142, camera flash (es) 146, display 145, hardware buttons 106a-n, microphone (s) 108, and speaker(s) 144. Hardware buttons 106a-n are selectable buttons which are used to receive manual/tactile input from a user to control specific operations of electronic device 100 and/or of applications executing thereon. In one embodiment, hardware buttons 106a-n may also include or may be connected to one or more sensors (e.g. a fingerprint scanner) and/or may be pressure sensitive. Hardware buttons 106a-n may also be directly associated with one or more functions of a graphical user interface (not pictured) and/or functions of OS 116, application, or hardware of electronic device 100. In one embodiment, hardware buttons 106a-n may include a keyboard. Microphone(s) 108 may be used as an audio input device to receive spoken input/commands from a user or ambient sounds from the surroundings. Speaker(s) 144 is used to output audio.

CPU(s) 104 is also coupled to sensors 122a-n and display 145. Sensors 122a-n can include, but are not limited to, at least one of: infrared (IR) sensors, thermal sensors, light sensors, proximity sensors, camera/image sensors, accelerometers, gyroscopes, magnetometers, microphones, barometers, air humidity sensors, pedometers, heart rate monitors, fingerprint sensors, radiation sensors, and iris scanners. Display 145 is capable of displaying text, media content, and/or a graphical user interface (GUI) of firmware and/or one or more applications executing on electronic device 100. The GUI can be rendered by CPU 104 for viewing on display 145 or be rendered by a graphics processing unit (GPU), in one embodiment. In another embodiment, display 145 is a touch screen that is also capable of receiving touch input from a user of electronic device 100, when the user is interfacing with a displayed GUI. In at least one embodiment, electronic device 100 can include a plurality of virtual buttons or affordances that operate in addition to, or in lieu of, hardware buttons 106a-n. For example, electronic device 100 can be equipped with a touch screen interface and provide, via a GUI, a virtual keyboard, virtual buttons or affordance, and/or other virtual icons for user interfacing therewith.

Electronic device 100 also includes battery 134, charging circuitry 136, and serial port 132 (e.g., a USB (universal serial bus) port) which can operate as a charging port that receives power via an external charging device (not pictured) for charging battery 134. Serial port 132 may also function as one of an input port, an output port, and a combination input/output port. Serial port 132 also provides a physical interface between charging circuitry 136 and an external charging device (not pictured) for charging battery 134. Battery 134 may include a single battery or multiple batteries for providing power to components of electronic device 100. In one embodiment, battery 134 may include at least one battery that is removable and/or replaceable by an end user. In another embodiment, battery 134 may include at least one battery that is permanently secured to electronic device 100.

Electronic device 100 also includes one or more wireless radios 140a-n and can include one or more antenna(s) 148a-n that enable electronic device 100 to wirelessly connect to, and transmit and receive voice and/or data communication to/from one or more other devices, such as devices 152a-n and server 154. As a wireless device, electronic device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, electronic device 100 may be further equipped with an infrared (IR) device (not pictured) for communicating with other devices using an IR connection. In another embodiment, wireless radios 140a-n may include a short-range wireless device, including, but not limited to, a near field communication (NFC) device. In still another embodiment, electronic device 100 may communicate with one or more other device(s) using a wired or wireless USB connection.

Figure 2:
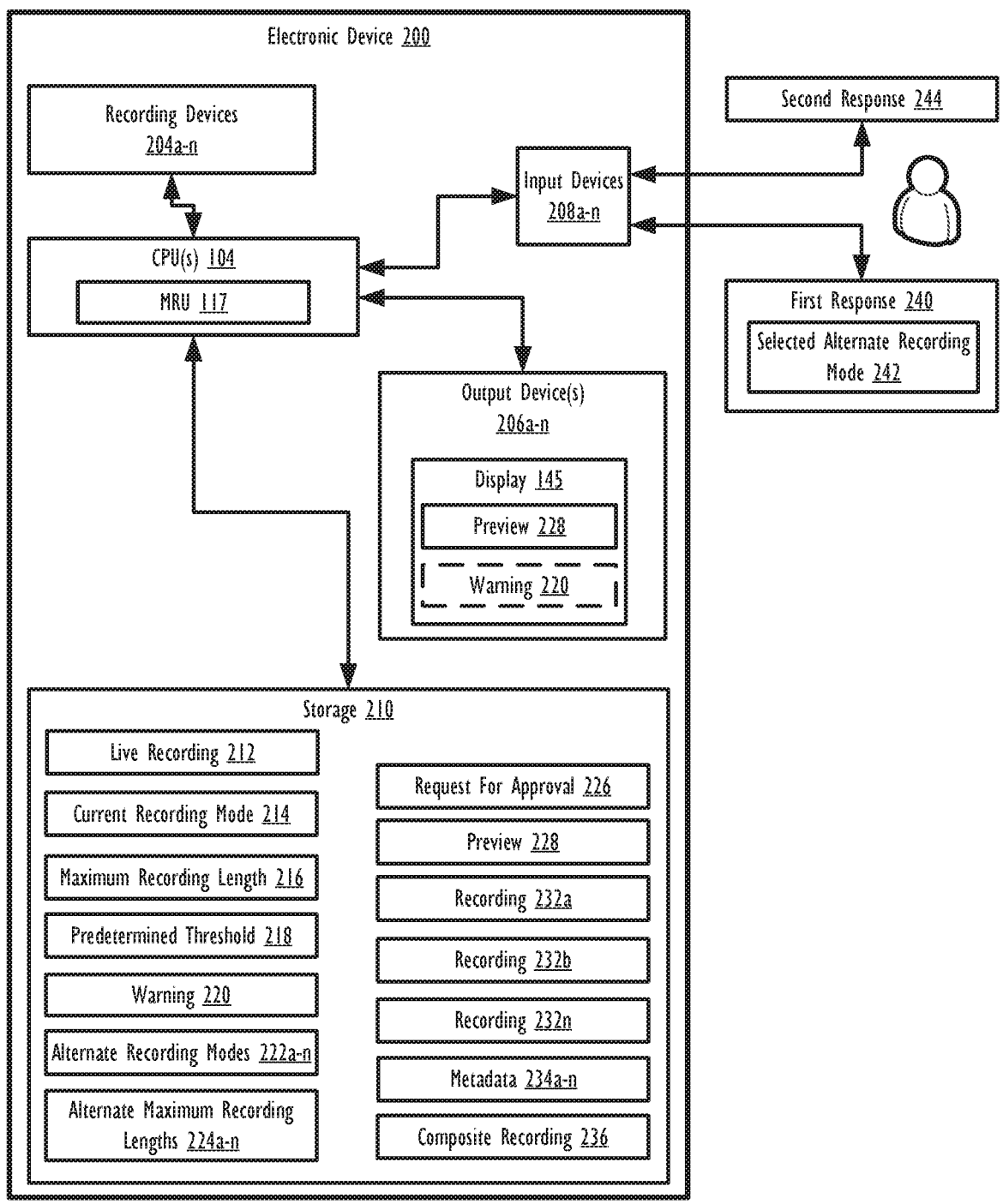
FIG. 2 illustrates an example electronic device configured to issue a determine a maximum recording length for a live recording, in accordance with one or more embodiments.

FIG. 2 is a block diagram illustrating an example electronic device configured to autonomously determine a maximum recording length for an ongoing live recording, in accordance with one or more embodiments of the present disclosure. For consistency in the description thereof, electronic device 200 is assumed to be similar to electronic device 100 and include similar components. Electronic device 200 includes CPU(s) 104, which executes MRU 117, recording devices 204a-n, input devices 208a-n, storage 210, and output devices 206a-n. In one or more embodiments, output devices 206a-n include display 145. In one or more embodiments, input devices 208a-n include microphones, cameras, and/or other audio, image, and/or video capture devices. Input devices 208a-n may include styli, touchscreens (e.g., display 145), keyboards, and mice. In another embodiment, input devices 208a-n may include a wireless receiver that receives input from another device (not pictured). It should be noted that storage 210 includes at least one storage device of electronic device 200, which may include, but is not limited to, system memory (e.g., system memory 110), removable memory (e.g., removable storage cards, not pictured), and/or non-volatile storage (e.g., non-volatile storage 120).

Electronic device 200 captures live recording 212 via at least one of recording devices 204a-n, and electronic device 200 stores the captured recording to storage 210. MRU 117 determines, at the onset of live recording 212, current recording mode 214, which establishes a current configuration and/or the current recording parameters of recording devices 204a-n that is/are used to capture live recording 212. These recording parameters may include, for example, a video resolution, video frame rate, video compression, audio compression, a number of audio channels, and an audio bitrate of live recording 212.

In response to determining current recording mode 214, MRU 117 determines an available free space within storage 210 that may be used for storing live recording 212. Based on the determined available free space within storage 210, MRU 117 calculates maximum recording length 216, which represents a maximum duration of live recording that may be stored within storage 210 before storage 210 is completely full. For example, if storage 210 has 500 megabytes of available free space, MRU 117 may calculate maximum recording length 216 to be 60 minutes and 20 seconds for current recording mode 214.

In response to determining maximum recording length 216, MRU 117 determines whether maximum recording length 216 is less than predetermined threshold 218. Predetermined threshold 218 represents a minimum remaining duration for live recording 212 (e.g., 5 minutes). In one embodiment, predetermined threshold 218 may be preprogrammed in electronic device 200 by a manufacturer or vendor (for example). In another embodiment, predetermined threshold 218 is established by a user of electronic device 200 at a time prior to initiating live recording 212. In response to determining maximum recording length 216 is not less than predetermined threshold 218, MRU 117 continually monitors maximum recording length 216 during the capture of live recording 212. In one or more embodiments, MRU 117 may continually output, to an output device (e.g., display 145) of electronic device 200, a time remaining notification (e.g., new time remaining 314 of FIG. 3) which provides a real-time indication of maximum recording length 216.

In response to determining maximum recording length 216 is less than predetermined threshold 218, MRU 117 generates and issues warning 220 to at least one of output devices 206a-n to alert a user of electronic device 200 that maximum recording length 216 is less than predetermined threshold 218. In one embodiment, warning 220 requests a user tender a response (e.g., first response 240) that includes selected alternate recording mode 242, as described in greater detail below. In one or more embodiments, warning 220 may include a visual warning displayed on/within a user interface and/or a visually displayed notification that includes maximum recording length 216. The visual warning 220 is viewable on an output component (e.g., display 145) of electronic device 200. In one or more embodiments, in response to generating warning 220, MRU 117 may continually update warning 220 in real time on output devices 206a-n such that warning 220 is a dynamic warning (versus a one-time/static warning) that provides a live countdown of maximum recording length 216.

In one or more embodiments, MRU 117 also determines alternate recording mode(s) 222a-n that, when applied to recording devices 204a-n and/or applications (e.g., applications 118 of FIG. 1) of electronic device 200, alters maximum recording length 216 of live recording 212. For each of alternate recording modes 222a-n, MRU 117 calculates alternate maximum recording length 224a-n, each of which represents an estimated duration of live recording 212 that may be stored in storage 210 if recorded in a corresponding alternate recording mode 222a-n. In one or more embodiments, MRU 117 includes alternate recording modes 222a-n and alternate maximum recording lengths 224a-n within warning 220. Accordingly, alternate recording modes 222a-n and/or alternate maximum recording lengths 224a-n may be displayed within warning 220 on at least one output device 206a-n, as shown in greater detail in FIGS. 3A-3B. In one or more embodiments, warning 220 may further include an audio notification such as a notification tone or text-to-speech audio notification that identifies maximum recording length 216 to a user of electronic device 220. In another embodiment, warning 220 may include haptic feedback provided by an internal vibration motor (not pictured) of electronic device 200.

In response to issuing warning 220, MRU 117 enables entry of first response 240 via input devices 208a-n. First response 240 is an input provided at input devices 208a-n that is a reply to warning 220 and which includes selected alternate recording mode 242. Selected alternate recording mode 242 is a recording mode that is to be applied to recording devices 204a-n to replace current recording mode 214 for the capture of live recording 212. In one or more embodiments, in response to receiving first response 240, MRU 117 identifies selected alternate recording mode 242 within first response 240 and reconfigures electronic device 200 based on selected alternate recording mode 242. In reconfiguring electronic device 200, MRU 117 may reconfigure recording devices 204a-n, software, firmware, and/or input/output devices within electronic device 200 based on selected alternate recording mode 242. In one or more embodiments, in reconfiguring electronic device 200, MRU 117 replaces and/or modifies current recording mode 214 based on selected alternate recording mode 242 to enable recording devices 204a-n to capture live recording 212 in accordance with selected alternate recording mode 242. In one embodiment, selected alternate recording mode 242 may be one of alternate recording mode 222a-n included within warning 220. For example, a user of electronic device 200 may, as selected alternate recording mode 242, select one of alternate recording modes 222a-n within warning 218 as presented on display 145, as described in greater detail in FIG. 3A. In another embodiment, selected alternate recording mode 242 may be manually input by a user of electronic device 200 via input device 208a-n, as described in greater detail in FIG. 3B.

In one or more embodiments, in response to issuing warning 220 to output devices 206a-n, MRU 117 may output preview 228 to a display (e.g., display 145) of electronic device 200. Preview 228 includes a live representation/depiction of live recording 212 in a particular alternate recording mode (e.g. alternate recording mode 222a). In one embodiment, the particular alternate recording mode may be a suggested alternate recording mode that is determined by MRU 117 during the generation of warning 220. In another embodiment, the particular alternate recording mode may be one of alternate recording mode 222a-n included within warning 220 and that is toggled/selected within a user interface of warning 220 but is not yet confirmed as selected alternate recording mode 242. In another embodiment, electronic device receives an indication of the particular alternate recording mode from a user via input devices 208a-n. In response to providing preview 228 to display 145, MRU 117 issues, to at least one of output devices 206a-n, request for approval 226, which requests that a user of electronic device 200 approve or deny alternate recording mode 222a. A user may view preview 228 on display 145 and enter, via at least one of input devices 208a-n, second response 244 which indicates whether alternate recording mode 222a, displayed via preview 228, is acceptable. In response to determining second response 244 approves alternate recording mode 222a, MRU 117 applies alternate recording mode 222a to electronic device 200. In one or more embodiments, the capture of live recording 212 in current recording mode 214 continues while preview 228 is presented on display 145 and live recording is reconfigured/reinitialized in alternate recording mode 222a responsive to determining second response 244 approves alternate recording mode 222a. In another embodiment, a first camera of electronic device 200 is used to record live recording 212 in current recording mode 214 and a second camera of electronic device 200 is used to capture preview 228 for viewing on display 145.

In one or more embodiments, the application of selected alternate recording mode 242 to recording devices 204a-n may necessitate that a new recording file be created on electronic device 200. In response to receiving selected alternate recording mode 242, MRU 117 saves the current live recording 212 to recordings 232a-n and reinitializes the capture of live recording 212 in the selected alternate recording mode 242. It should be noted that MRU 117 continues to capture live recording 212 in current recording mode 214 until selected alternate recording mode 242 is applied to recording devices 204a-n. In conjunction with applying selected alternate recording mode 242, MRU 117 simultaneously stores the current live recording 212 to recordings 232a-n and reinitializes live recording 212 in the selected alternate recording mode 242.

In one or more embodiments, MRU 117 may also save metadata 234a-n for each of recordings 232a-n. Metadata 234a-n includes timestamp data that identifies a start time and a stop time of a corresponding recording 232a-n. MRU 117 may create composite recording 236 by connecting recordings 232a-n based on metadata 234a-n. Composite recording 236 may then be provided to output devices 206a-n as a continuous gapless output that seamlessly transitions between each of recordings 232a-n. When viewed, composite recording 236 provides a continuous output of recordings 232a-n. Thus, a user of electronic device 200 may continually observe recordings 232a-n in the chronological order in which they were recorded without having to manually initiate playback of each recording.

Figure 3A:
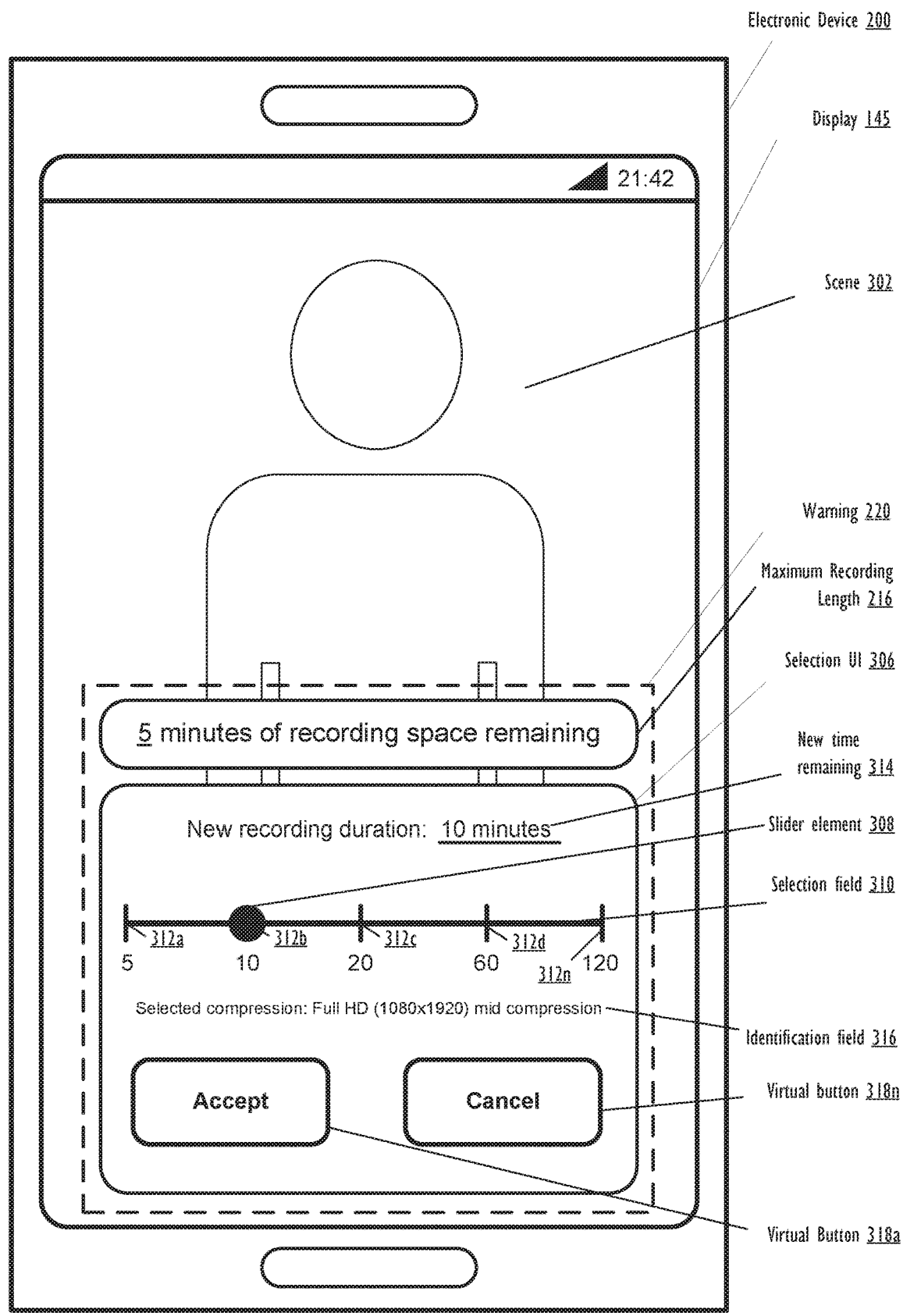
FIG. 3A is an illustration depicting a first exemplary user interface showing a warning, in accordance with one or more embodiments.

FIG. 3A is an illustration that depicts a first exemplary user interface presenting a warning, in accordance with one or more embodiments of the present disclosure. In the example illustrated in FIG. 3A, electronic device 200 includes display 145. On display 145 there is provided scene 302, which is recorded as live recording 212 by a camera (e.g., camera 142). As described in FIG. 2 above, in response to determining that maximum recording length 216 is greater than predetermined threshold 218, the CPU generates warning 220 and outputs warning 220 to display 145. As illustrated, warning 220 includes selection user interface (UI) 308 and maximum recording length 216, which indicates, for example, 5 minutes of recording storage remains in storage 210 for live recording 212. In one or more embodiments, maximum recording length 216 is updated in real time based on an amount of available free space in storage 210.

Selection UI 306 provides selection fields 312a-n where a user of electronic device 200 may toggle between available alternate recording modes 222a-n (of FIG. 2) and select a desired alternate recording mode (e.g., alternate recording mode 222b) as selected alternate recoding mode 242 (of FIG. 2). As illustrated, selection UI 306 includes slider element 308 that a user of electronic device 200 may move horizontally across selection field 310 via an input device (e.g., a touchscreen display or input device 208a-n) of electronic device 200 to toggle through available alternate recording modes 222a-n. As illustrated, selection field 310 includes positions 312a-n. Each of positions 312a-n corresponds to a particular one of alternate recording mode 222a-n. Each of positions 312a-n is designated on selection field 310 by a vertical mark and a numerical identifier which identifies alternate maximum recording length 224 associated with the corresponding alternate recording mode 222a-n.

Selection UI 306 also includes new time remaining field 314, identification field 316, and virtual buttons 318a-n. New time remaining 314 displays the alternate maximum recording length 224 associated with the current position of slider element 310. Identification field 316 identifies the alternate recording mode 222a-n associated with the current position 312a-n of slider element 310. For each position of slider element 308, identification field 316 may display any of a name/identifier, configuration, and/or recording parameters associated with a corresponding alternate recording mode 222a-n. In the provided illustration, slider element 308 is at position 312b which corresponds to alternate recording mode 222b and is associated with alternate maximum recording length 224b. Virtual button 318a when selected, via an input device, accepts an alternate recording mode 222a-n that is associated with the current selection of position 312a-n on slider element 308 as selected alternate recording mode 242. Virtual button 318n may be selected via an input device to exit/terminate the presentation of warning 220 on display 145 without selecting any of alternate recording modes 222a-n as selected alternate recording mode 242. It should be noted that while selection field 310 is illustrated as including five positions corresponding to five alternate recording modes, in another embodiment selection field 310 may have any number of positions, each of which correspond to a particular one of alternate recording modes 222a-n. In one or more embodiments, preview 228 is continually updated in real time as slider element is manipulated. Thus, preview 228 provides a live depiction of a quality of scene 302 in live recording 212 if recorded in an alternate recording mode 222a-n corresponding to the current position of slider element 308.

Figure 3B:
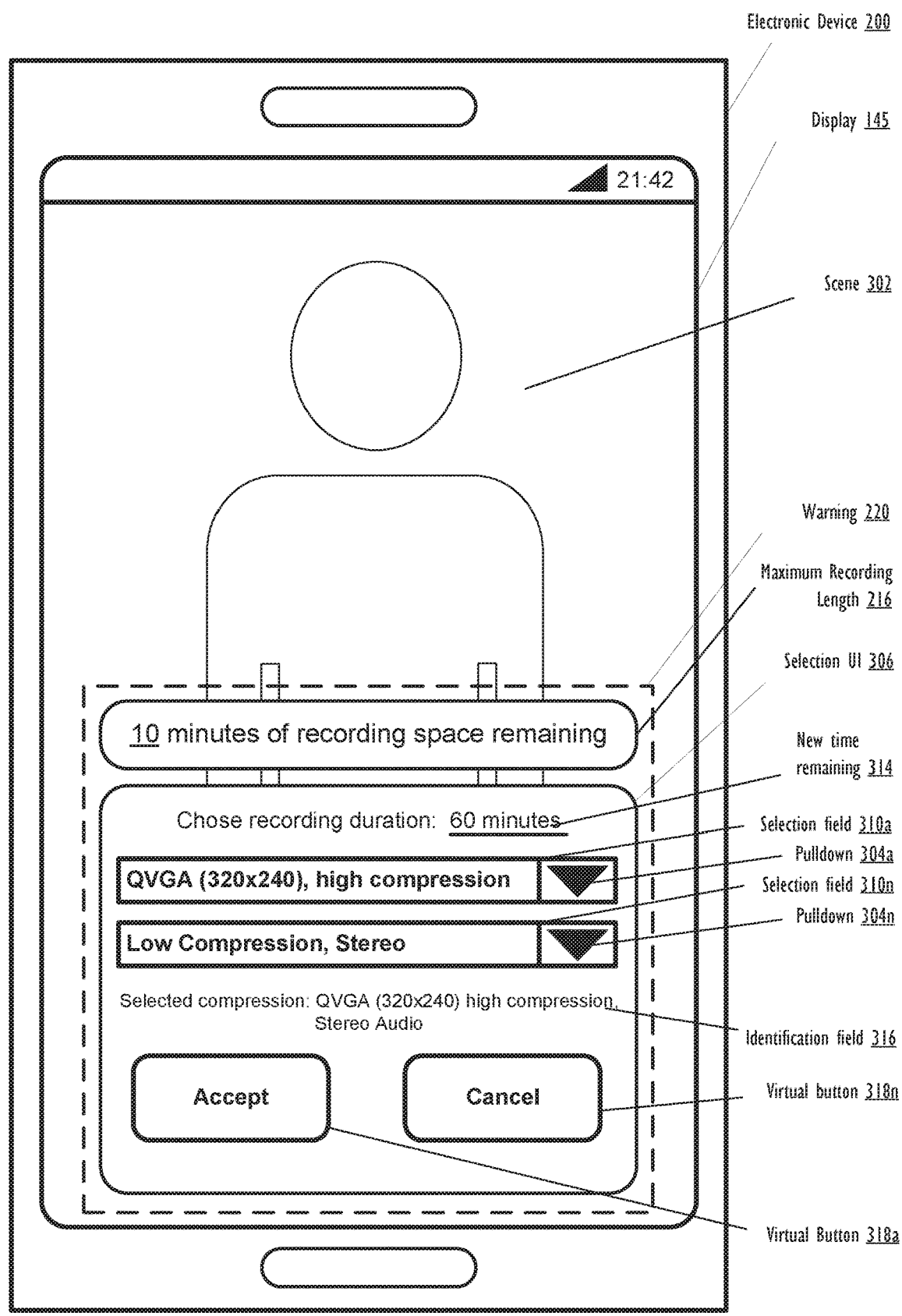
FIG. 3B is an illustration depicting a second exemplary user interface showing a warning, in accordance with one or more embodiments.

FIG. 3B is an illustration that depicts a second exemplary user interface presenting a warning, in accordance with one or more embodiments of the present disclosure. In the example illustrated in FIG. 3B, warning 220 includes maximum recording length 216, which indicates 10 minutes of recording storage remain in electronic device 200 for live recording 212. In the illustrated embodiment of FIG. 3B, selection UI 306 includes a first selection field (selection field 310a) and a second selection field 310n. First selection field 310a includes video configuration and/or recording parameters, such as various resolution and/or compression options that are supported by video recording devices (e.g., cameras) of recording devices 204a-n. The various video configuration and/or recording parameters are accessed by manipulating pulldown affordance 304a of first selection field 310a. By toggling pulldown affordance 304a (e.g., via user input devices 208a-n), a user of electronic device 200 may select one of the configurations and/or recording parameters included within first selection field 310a. Second selection field 310n includes audio configuration and/or recording parameters, such as channel configurations and/or compression options that are supported by audio recording devices (e.g., microphones) of recording devices 204a-n. The various audio configuration and/or recording parameters are accessed by manipulating pulldown affordance 304n. By toggling pulldown affordance 304n (e.g., via user input devices 208a-n), a user of electronic device 200 may select one of the configuration and/or recording parameters included within second selection field 310n. It should be noted that while the illustrated embodiment provides two selection fields, in one or more embodiments, selection UI 306 may include any number of selection fields 310, each of which may be manipulated by a user of electronic device 200 to choose selected alternate recording mode 242 from among alternate recording modes 222a-n. In another embodiment, a user of electronic device 200 may manipulate selection fields 310a-n to create a customized alternate recording mode that becomes selected alternate recording mode 242 when virtual button 318a is actuated.

Virtual button 318a may be selected via an input device to accept the displayed selections within selection fields 310a-n as selected alternate recording mode 242. Virtual button 318n may be selected via an input device to terminate the presentation of warning 220 on display 145 without choosing a selected alternate recording mode.

Figure 4:
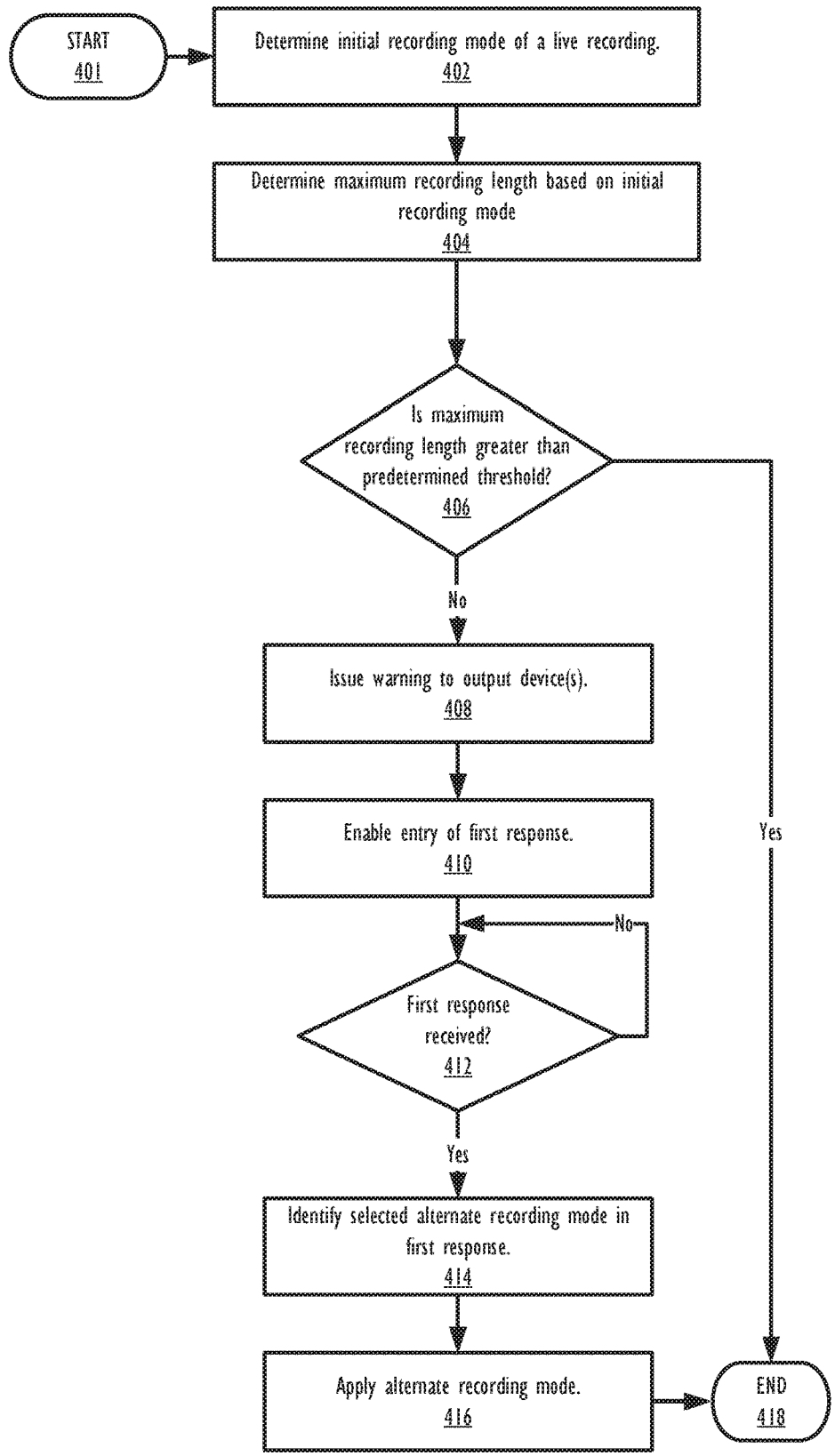
FIG. 4 is a flow chart illustrating a method for determining and applying an alternate recording mode to a live recording, in accordance with one or more embodiments.

Referring now to FIG. 4, there is depicted a high-level flow-chart illustrating a method for determining and applying an alternate recording mode to a live recording, in accordance with one or more embodiments of the present disclosure. Aspects of the method are described with reference to the components of FIGS. 1-3B. Several of the processes of the method provided in FIG. 4 can be implemented by a processor (e.g., CPU 104) executing software code of respective MRU 117 within an electronic device (e.g. FIG. 1 or FIG. 2). The method processes described in FIG. 4 are generally described as being performed by electronic device 200.

Method 400 commences at initiator block 401 then proceeds to block 402. At block 402, CPU 104 determines an initial recording mode (initial recording mode 214) associated with live recording 212. At block 404, CPU 104 determines a maximum recording length 216 of live recording 212 that may be stored within storage 210. In response to determining maximum recording length 216, method 400 proceeds to decision block 406 and CPU 104 determines whether maximum recording length 216 is greater than predetermined threshold 218. In response to determining maximum recording length 216 is greater than predetermined threshold 218, method 400 terminates at end block 418.

In response to determining at block 406 that maximum recording length 216 is not greater than predetermined threshold 218, the CPU generates and outputs warning 220 to at least one output device 206a-n (block 408). At block 410, the CPU enables entry of a response (e.g., first response 240) to warning 220 via input devices 208a-n. At block 412, the CPU determines whether first response 240 has been received. In one or more embodiments, the CPU continually monitors input devices 208a-n to determine when first response 240 has been received. In response to determining first response 240 has been received, the CPU identifies selected alternate recording mode 242 within first response 240 (block 414). In response to identifying selected alternate recording mode 242, the CPU reconfigures electronic device 200 based on selected alternate recording mode 242 (block 416). Method 400 then terminates at end block 418.

Figure 5:
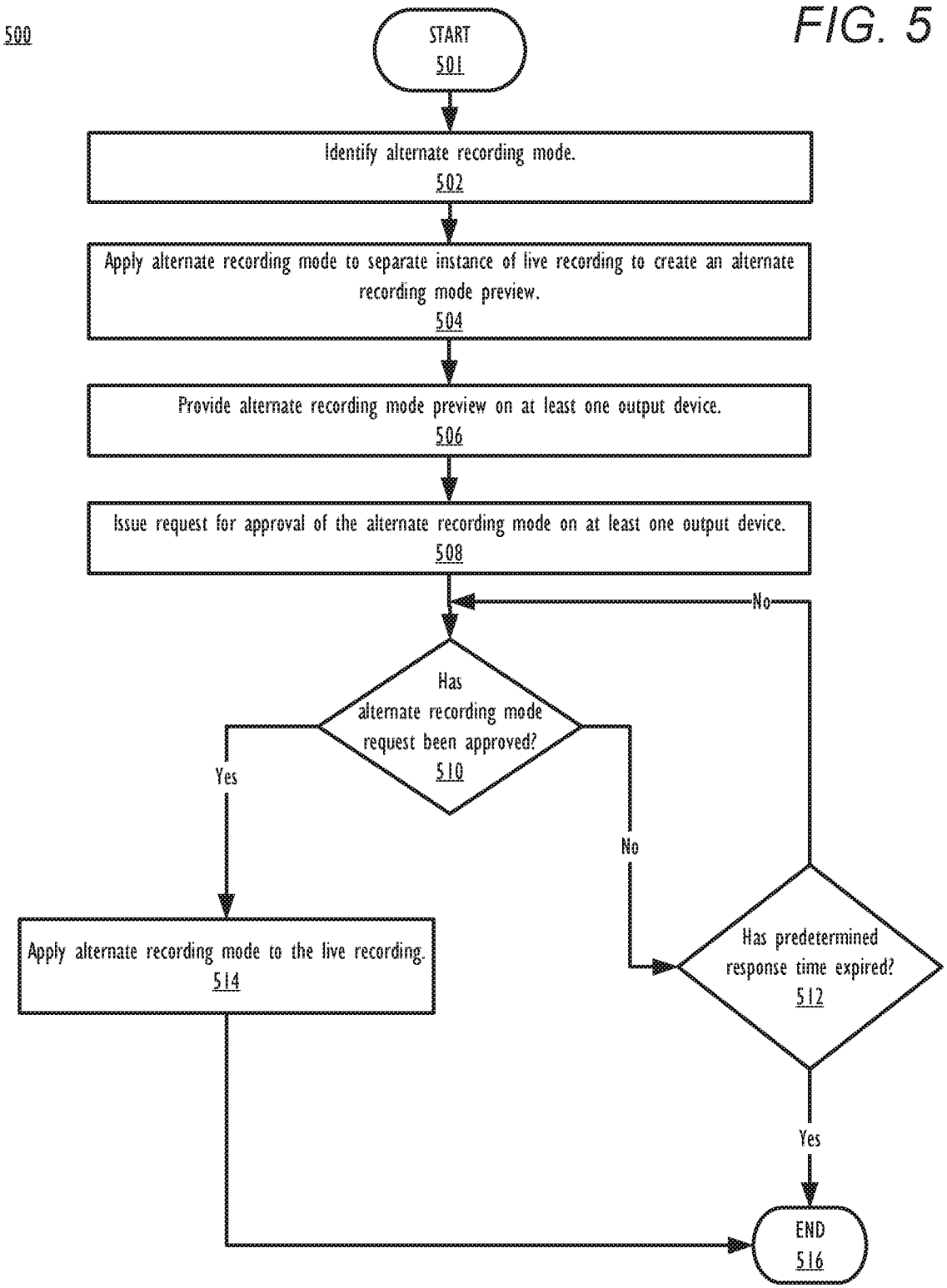
FIG. 5 is a flow chart illustrating a method for providing a live preview of an alternate recording mode, in accordance with one or more embodiments.

Referring now to FIG. 5, there is depicted a high-level flow-chart illustrating a method for providing a live preview of at least one alternate recording mode on an output device, in accordance with one or more embodiments of the present disclosure. Aspects of the method are described with reference to the components of FIGS. 1-3B. Several of the processes of method 500 provided in FIG. 5 can be implemented by a CPU (e.g., CPU 104) executing software code of MRU 117 within an electronic device (e.g., electronic device 200 of FIG. 2). The method processes described in FIG. 5 are generally described as being performed by electronic device 200.

Method 500 commences at initiator block 501, then proceeds to block 502. At block 502, CPU(s) 104 identifies a particular alternate recording mode (e.g., alternate recording mode 222b) to be previewed on at least one output device (e.g., display 145). At block 504, the CPU applies alternate recording mode 222b to a separate instance of live recording 212 to create a preview (preview 228) of live recording 212 in alternate recording mode 222b. At block 506, preview 228 is presented on at least one output device (e.g., display 145). At block 508, the CPU issues a request for approval (e.g., request for approval 226) of the previewed alternate recording mode 222b to at least one output device (e.g., output devices 206a-n). The CPU then determines whether the previewed alternate recording mode 222b has been approved (block 510). In response to determining alternate recording mode 222b has not been approved, the CPU determines whether a predetermined response time since preview 228 was presented has expired (block 512). In response to determining a predetermined response time since preview 228 was presented has not expired, method 500 loops back to block 510. In response to determining a predetermined response time since preview 228 was presented has expired, method 500 terminates at end block 516.

In response to determining alternate recording mode 222b has been approved, the CPU applies alternate recording mode 222b to live recording 212 (block 514). Method 500 then terminates at end block 516. As provided in greater detail in FIG. 6, below, in response to applying alternate recording mode 222b to live recording 212, the processor saves the remainder of the recorded content in the alternate recording mode in lieu of the original recording mode until the recording ends and/or another threshold is met associated with the alternate recording mode. For example, in response to applying alternate recording mode 222b once a predetermined threshold (e.g., predetermined threshold 218) of five minutes has been exceeded, the processor (1) saves the previously recorded content to recording 232a, (2) applies alternate recording mode 222b, and (3) continues recording live recording 212 in alternate recording mode 222b. In response to the predetermined threshold again being exceeded and a new selected alternate recording mode (e.g., alternate recording mode 222c) being approved, the processor (1) saves the previously recorded content to recording 232b, (2) applies alternate recording mode 222c, and (3) continues recording live recording 212 in alternate recording mode 222c.

Figure 6:
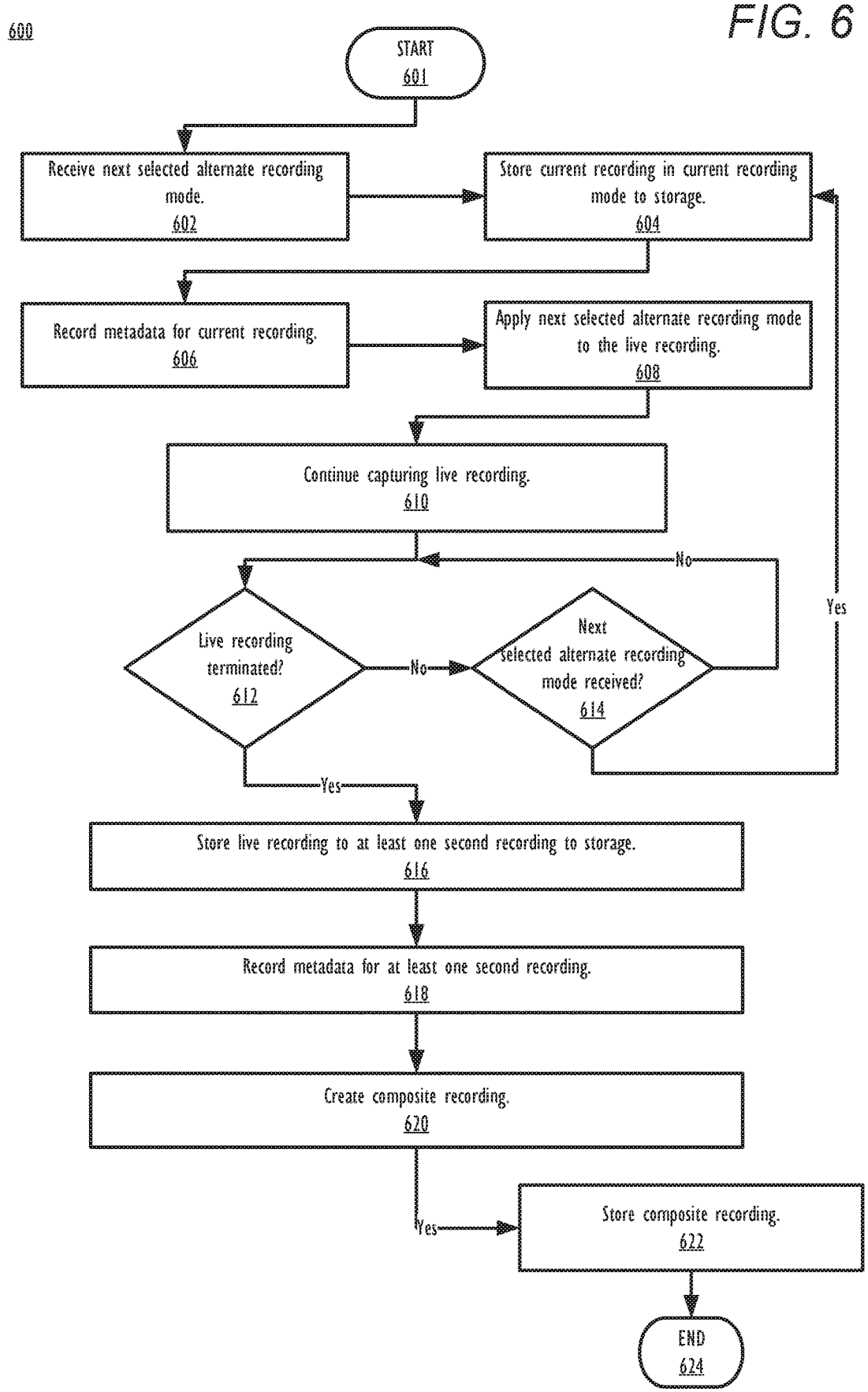
FIG. 6 is a flow chart illustrating a method for creating a composite recording from a live recording that includes multiple individual recordings, in accordance with one or more embodiments.

Referring now to FIG. 6, there is depicted a high-level flow-chart illustrating a method for providing a composite recording, in accordance with one or more embodiments of the present disclosure. Aspects of the method are described with reference to the components of FIGS. 1-3B. Several of the processes of method 600 provided in FIG. 6 can be implemented by a CPU (e.g., CPU 104) executing software code of respective MRU 117 within an electronic device (e.g., electronic device 200 of FIG. 2). The method processes described in FIG. 6 are generally described as being performed by electronic device 200. In one embodiment, the method processes described in FIG. 6 may be included within blocks 414-416 of FIG. 4 and/or block 512-514 of FIG. 5.

Method 600 commences at initiator block 601, then proceeds to block 602. At block 602, CPU 104 receives a next selected alternate recording mode (e.g., selected alternate recording mode 242) to be applied to a live recording (e.g., live recording 212). In response to receiving the next selected alternate recording mode 242, the CPU stores the entirety of live recording 212 to a recording (e.g., recording 232a) in a storage (e.g., storage 210) of electronic device 200 (block 604). At block 606, metadata 234a for recording 232a is generated and stored to storage 210. At block 608, the CPU applies the next selected alternate recording mode 242 to live recording 212. At block 610, CPU continues capturing live recording 212 in selected alternate recording mode 242a. It should be noted that in one or more embodiments, blocks 604-610 are performed simultaneously to ensure there are no gaps between recordings 232a-n and live recording 212.

At block 612, the CPU determines whether live recording 212 has ended. In response to determining that live recording has not been terminated, the CPU determines whether an alternate recording mode (e.g., alternate recording mode 222b) has been received and selected as a next selected alternate recording mode 242 (block 614). In response to determining an alternate recording mode (e.g., alternate recording mode 222b) has been received and selected as a next selected alternate recording mode 242, method 600 continues back to block 604 in an iterative manner. In response to determining a next selected alternate recording mode has not been received, method 600 loops back to block 612.

In response to determining that live recording has been terminated, the CPU stores the current live recording 212 to at least one second recording (e.g., recording 232n) in storage 210 (block 616). The CPU then records metadata 234n for recording 232n (block 618). At block 620, the CPU links recordings 232a-n to create a gapless composite recording 236. At block 622, the CPU stores composite recording 236 in storage. Method 600 then terminates at end block 624.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: an electronic computer diskette, a hard disk, a random-access memory (RAM), a read-only memory (ROM), an erasable programmable read-only memory (EPROM or Flash memory), an electronic compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
    determining an initial recording mode associated with a live recording being captured by at least one sensor of a recording device of an electronic device;
    calculating, based on the initial recording mode, a maximum recording length of the live recording that may be stored in available free space of at least one storage device of the electronic device;
    determining whether the maximum recording length is less than a predetermined threshold;
    in response to determining the maximum recording length is less than the predetermined threshold, generating and outputting, to at least one output device of the electronic device, (i) a warning that includes the maximum recording length and (ii) a selection user interface (UI) that presents at least one alternate recording mode and an associated at least one alternate maximum recording length, the outputting of the selection UI comprising:
        presenting a selection field having a plurality of selection field positions visually presented along a length of the selection field, each visually presented selection field position corresponding to a particular one of a plurality of available alternate recording modes selectable via a slider element on the selection field, each of the plurality of positions designated by a visual numerical identifier that visually provides an alternate maximum recording length associated with a corresponding alternate recoding mode identified by a position of the slider element along the selection field; and
        presenting within the selection UI the slider element movable horizontally across the selection field via an input device to toggle through available alternate recording modes;
    providing, on the at least one output device, a preview which includes a representation of the live recording in the alternate recording mode; and
    enabling entry within the selection UI of a first response to the warning, the response including an identification of a selected alternate recording mode.

2. The method of claim 1, the method further comprising:
    in response to receiving the first response, applying the selected alternate recording mode to continue capturing the live recording using the selected alternate recording mode, wherein a previous portion of the live recording is recorded in the initial recording mode as a default recording mode until the selected alternate recording mode is received and applied to the live recording, and a subsequent portion of the live recording is recorded in the selected alternate recording mode.

3. The method of claim 1, wherein during the generating of and prior to issuing the warning, the method further comprises:
    determining the at least one alternate recording mode that, when applied to the live recording, alters the maximum recording length; and
    determining, for each alternate recording mode, the at least one alternate maximum recording length of recording that may be stored in the available free space of at least one storage device.

4. The method of claim 1, further comprising:
    creating a new recording file to capture the preview of the live recording in the alternate recording mode;
    continually capturing the live recording in a current recording mode until a selected alternate recording mode is applied to the recording device; and
    in response to applying the selected alternate recording mode to the recording device, stopping the capturing of the live recording in the current recording mode and continuing the capturing of the live recording in the selected alternate recording mode.

5. The method of claim 4, wherein applying the selected alternate recording mode to the recording device comprises:
    issuing, via the at least one output device, a request for approval of the alternate recording mode;
    receiving a second response to the request which identifies whether the selected alternate recording mode is approved for the live recording; and applying the selected alternate recording mode to the live recording in response to the second response approving the use of the selected alternate recording mode.

6. The method of claim 1, wherein the alternate recording mode modifies at least one of:
a video resolution of the live recording;
a video frame rate of the live recording;
an audio compression of the live recording; and
a video compression of the live recording.

7. The method of claim 1, further comprising:
storing a first portion of the live recording that is recorded in the initial recording mode to a first recording;
storing at least one second portion of the live recording that is recorded in at least one alternate recording mode to at least one second recording within a new recording file;
recording metadata associated with the initial recording mode and the at least one alternate recording mode, wherein the metadata includes timestamp data that identifies a start time and a stop time for the first portion and the at least one second portion;
linking, based on the metadata, the first recording and the at least one second recording to create a composite recording that when output on the at least one output device, seamlessly transitions between the first recording and each of the at least one second recording in chronological order; and
in response to receiving a request to play back the live recording, providing the composite recording to the at least one output device of the electronic device.

8. The method of claim 1, wherein issuing the warning further comprises:
presenting within the selection UI a first selection field and a second selection field, the first selection field including at least one of video configurations and video recording parameters that are accessed by manipulating a pulldown affordance of the first selection field, which enables selection of one of the video configurations or video recording parameters, and the second selection field including at least one of audio configuration and audio recording parameters that are selected by toggling a pulldown affordance of the second selection field.

9. The method of claim 1, further comprising:
presenting within the selection field a plurality of vertical marks with associated numerical identifiers, each identifying an alternate maximum recording length associated with a corresponding alternate recording mode.

10. The method of claim 1, further comprising:
presenting within the selection UI a new time remaining field, an identification field, and a plurality of virtual buttons, the identification field visually displaying an alternate recording mode associated with a current position of the slider element, wherein for each position of the slider element, the identification field displays at least one of a name/identifier, a configuration, and recording parameters associated with a corresponding alternate recording mode; and
accepting an alternate recording mode that is associated with the current position on slider element as the selected alternate recording mode in response to receipt of a selection of the virtual button.

11. An electronic device comprising:
a memory;
at least one recording device that includes at least one sensor which captures and records a live recording to the memory;
a processor that is coupled to the memory and which:
determines an initial recording mode associated with the live recording;
calculates, based on the initial recording mode, a maximum recording length of the live recording that may be stored in available free space of the memory;
determines whether the maximum recording length is less than a predetermined threshold; and
in response to determining the maximum recording length is less than the predetermined threshold, generates a warning that includes the maximum recording length and a selection user interface (UI) that presents at least one alternate recording mode and an associated at least one alternate maximum recording length, the selection UI presenting a selection field having a plurality of selection field positions visually presented along a length of the selection field, each visually presented selection field position corresponding to a particular one of a plurality of available alternate recording modes selectable via a slider element on the selection field, each of the plurality of positions designated by a visual numerical identifier that visually provides an alternate maximum recording length associated with a corresponding alternate recoding mode identified by a position of the slider element along the selection field;
presents within the selection UI the slider element movable horizontally across the selection field via an input device to toggle through available alternate recording modes;
provides, on the at least one output device, a preview which includes a representation of the live recording in the alternate recording mode; and
at least one output device communicatively coupled to the processor and which outputs the warning; and
at least one input device communicatively coupled to the processor and which receives entry within the selection UI of a first response to the warning, the response including an identification of a selected alternate recording mode and forwards the first response to the processor.

12. The first device of claim 11, wherein:
the at least one input device receives the first response; and
the processor applies the alternate recording mode to the at least one recording device to reconfigure the at least one recording device in the alternate recording mode.

13. The first device of claim 11, wherein the processor records the live recording in the initial recording mode as a default recording mode until the alternate recording mode is selected and applied to the at least one recording device and continues capturing a subsequent portion of the live recording using the selected alternate recording mode, wherein a previous portion of the live recording is recorded in the initial recording mode and the subsequent portion of the live recording is recorded in the selected alternate recording mode.

14. The first device of claim 11, wherein during the generation of and prior to issuing the warning, the processor:
determines the at least one alternate recording mode that, when applied to the at least one recording device, alters the maximum recording length; and
determines, for each alternate recording mode, at least one alternate maximum recording length that may be stored in the available free space of the memory.

15. The first device of claim 11, wherein in applying the selected alternate recording mode:

the processor issues a request for approval of the selected alternate recording mode to the at least one output device;

the at least one input device receives a second response to the request which identifies whether the selected alternate recording mode is approved for the live recording; and the processor:
   determines whether the second response approves the selected alternate recording mode; and
   in response to determining the second response approves the selected alternate recording mode, applies the selected alternate recording mode to the at least one recording device to reconfigure the at least one recording device in the selected alternate recording mode.

16. The first device of claim 11, wherein the alternate recording mode modifies at least one of:
   a video resolution of the live recording;
   a video frame rate of the live recording;
   an audio compression of the live recording; and
   a video compression of the live recording.

17. The first device of claim 11, wherein the processor:
   stores, to the memory, a first portion of the live recording that is recorded in the initial recording mode as a first recording;
   stores, to the memory, at least one second portion of the live recording that is recorded in at least one alternate recording mode as at least one second recording;
   records, to the memory, metadata associated with the initial recording mode and the at least one alternate recording mode, wherein the metadata includes timestamp data that identifies a start time and a stop time for the first portion and the at least one second portion; and
   links the first recording and the at least one second recording based on the metadata to create a composite recording that when output on the at least one output device, seamlessly transitions between the first recording and each of the at least one second recording in chronological order;

the at least one input device receives a play back request for the live recording; and the processor, in response to detecting the play back request, provides the composite recording on the at least one output device.

18. A computer program product comprising:
a non-transitory computer readable storage device; and
program code on the computer readable storage device that when executed by a processor associated with an electronic device, the program code enables the electronic device to provide the functionality of:

determining an initial recording mode associated with a live recording captured by at least one sensor of a recording device of the electronic device;
   calculating, based on the initial recording mode, a maximum recording length of the live recording that may be stored in available free space of at least one storage device of the electronic device;
   determining whether the maximum recording length is less than a predetermined threshold; and
   in response to determining the maximum recording length is less than the predetermined threshold:
      generating and issuing, to at least one output device of the electronic device, a warning that includes the maximum recording length and a selection user interface (UI) that presents at least one alternate recording mode and an associated at least one alternate maximum recording length, the selection UI presenting a selection field having a plurality of selection field positions visually presented along a length of the selection field, each visually presented selection field position corresponding to a particular one of a plurality of available alternate recording modes selectable via a slider element on the selection field, each of the plurality of positions designated by a visual numerical identifier that visually provides an alternate maximum recording length associated with a corresponding alternate recoding mode identified by a position of the slider element along the selection field;
      presenting within the selection UI the slider element movable horizontally across the selection field via an input device to toggle through available alternate recording modes;
      providing, on the at least one output device, a preview which includes a representation of the live recording in the alternate recording mode;
      enabling entry within the selection UI of a first response to the warning, the response including an identification of a selected alternate recording mode; and
      in response to receiving the first response, applying the alternate recording mode to the live recording.

19. The computer program product of claim 18, wherein the program code for generating and issuing the warning further comprises program code that enables the electronic device to provide the functionality of, during the generating of and prior to issuing the warning:
   determining the at least one alternate recording mode that, when applied to the live recording, alters the maximum recording length; and
   determining, for each alternate recording mode, the at least one alternate maximum recording length that may be stored in the available free space of at least one storage device.

\* \* \* \* \*